(12) United States Patent
New

(10) Patent No.: US 7,984,407 B1
(45) Date of Patent: Jul. 19, 2011

(54) PROGRAMMABLE DEVICE WITH CONTACT VIA PROGRAMMING

(75) Inventor: Bernard J. New, Carmel Valley, CA (US)

(73) Assignee: Xilinx, Inc., San Jose, CA (US)

(*) Notice: Subject to any disclaimer, the term of this patent is extended or adjusted under 35 U.S.C. 154(b) by 335 days.

(21) Appl. No.: 11/880,953

(22) Filed: Jul. 24, 2007

(51) Int. Cl.
*G06F 17/50* (2006.01)
(52) U.S. Cl. ........................ 716/117; 716/116
(58) Field of Classification Search .............. 716/16, 716/116, 117
See application file for complete search history.

(56) References Cited

U.S. PATENT DOCUMENTS

| | | | |
|---|---|---|---|
| 7,295,036 B1* | 11/2007 | Zaveri et al. | 326/38 |
| 7,498,835 B1* | 3/2009 | Rahman et al. | 326/38 |
| 7,548,091 B1* | 6/2009 | Liu | 326/40 |
| 7,853,811 B1* | 12/2010 | Walstrum et al. | 713/320 |
| 2006/0133185 A1* | 6/2006 | Miller et al. | 365/230.06 |
| 2007/0085563 A1* | 4/2007 | Ciccarelli et al. | 326/41 |
| 2007/0164785 A1* | 7/2007 | He | 326/41 |
| 2009/0160481 A9* | 6/2009 | Schmit et al. | 326/38 |

OTHER PUBLICATIONS

Anderson et al.; "Low-Power Programmable Routing Circuitry for FPGAs"; 2004; IEEE; Department of ECE University of Toronto; pp. 602-609.*

* cited by examiner

*Primary Examiner* — Suresh Memula
(74) *Attorney, Agent, or Firm* — W. Eric Webostad; LeRoy D. Maunu

(57) ABSTRACT

A programmable device with contact via programming to reduce leakage current and a method for reducing standby power for such programmable device are described. Configuration memory cells are identified responsive to instantiation of a user design in a test platform of the programmable device. The programmable device is via programmed during manufacturing thereof to not couple for programmability a first portion of the configuration memory cells and to form a first portion of the user design associated with the first portion of the configuration memory cells as hard-wired and to couple for programmability a second portion of the configuration memory cells for subsequent instantiation of a second portion of the user design in the programmable device.

14 Claims, 5 Drawing Sheets

PROGRAMMABLE DEVICE WITH CONTACT VIA PROGRAMMING

FIELD OF THE INVENTION

One or more aspects of the invention relate generally to integrated circuits and, more particularly, to a programmable device with contact via programming to reduce leakage current.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable. For purposes of clarity, FPGAs are described below though other types of PLDs may be used.

Heretofore, FPGAs were less suited to power-sensitive applications, such as battery-operated, portable devices, due to their power consumption. However, as is well known, FPGAs may include a significant number of unused programmable logic resources after instantiation of a user design. Even though unused, these programmable logic resources continue to consume power. For example, leakage current through an unused transistor contributes to standby power consumption.

Accordingly, it would be desirable and useful to provide means to reduce power consumption of a programmable logic device by reducing standby power of unused programmable logic resources.

SUMMARY OF THE INVENTION

One or more aspects of the invention generally relate to integrated circuits and, more particularly, to a programmable device with contact via programming to reduce leakage current.

An aspect of the invention is a method for reducing standby power for a programmable device. Configuration memory cells are identified responsive to instantiation of a user design in a test platform of the programmable device. The programmable device is via programmed during manufacturing thereof to not couple for programmability a first portion of the configuration memory cells to form a first portion of the user design associated with the first portion of the configuration memory cells as hard-wired and to couple for programmability a second portion of the configuration memory cells for subsequent instantiation of a second portion of the user design in the programmable device.

Another aspect of the invention is another method for reducing standby power for a programmable device. A user design is instantiated in a test platform of the programmable device. Unused input paths of multiplexers associated with a first portion of configuration memory cells of the programmable device are identified. Via programming disables circuitry associated with the unused input paths.

Yet another aspect of the invention is a method for reducing standby power for an integrated circuit having a first supply voltage of a first level and a second supply voltage of a second level, where the first level is higher than the second level. Whether a circuit of the integrated circuit is associated with a speed-limiting path is determined. If the circuit is for the speed-limiting path, first via programming couples the circuit to the first supply voltage. If the circuit is not for the speed-limiting path, second via programming couples the circuit to the second supply voltage.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
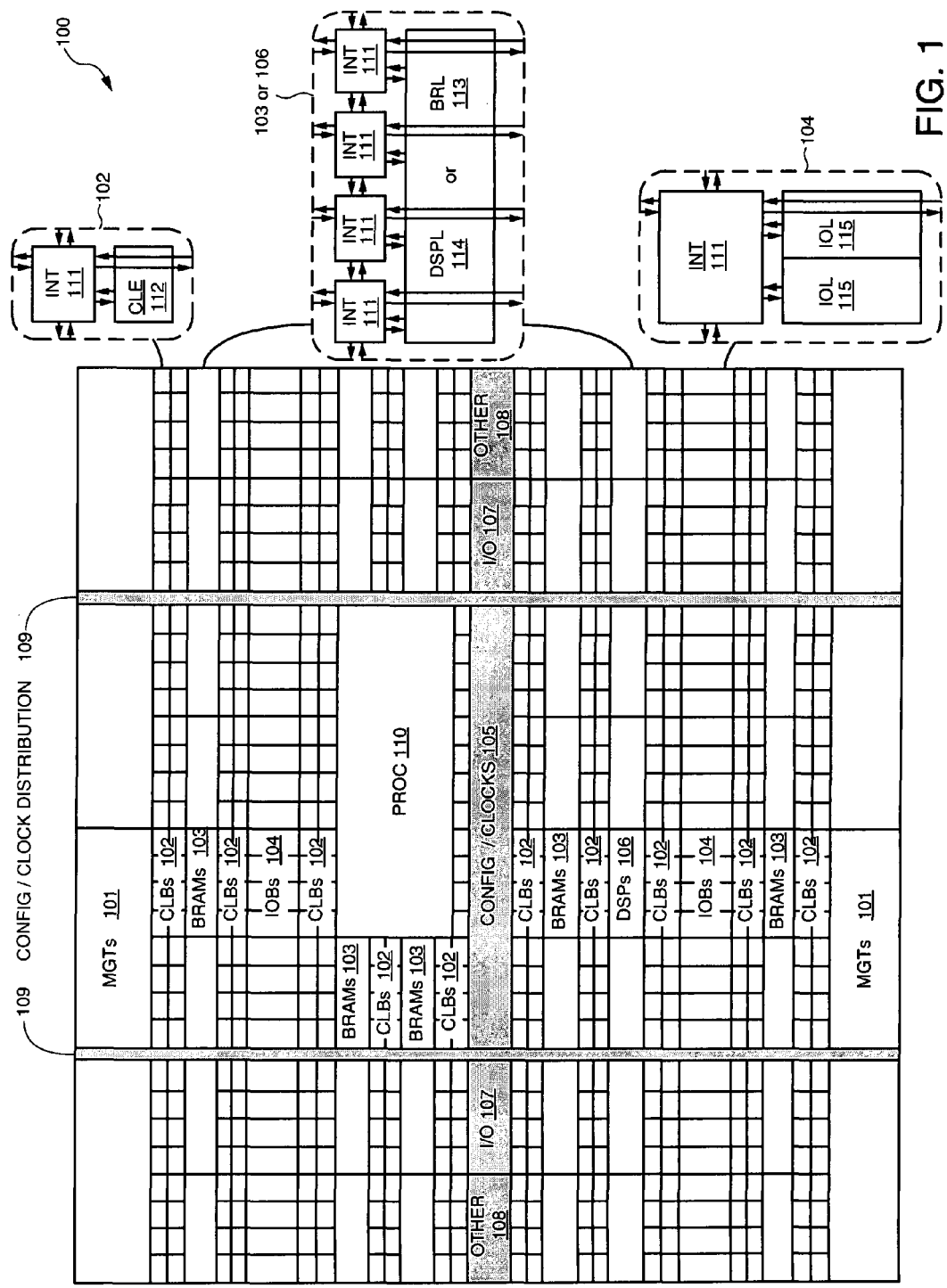
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, in which FPGA 100 is rotated 90 degrees, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex™-4 FPGA from Xilinx of San Jose, Calif.

Figure 2A:
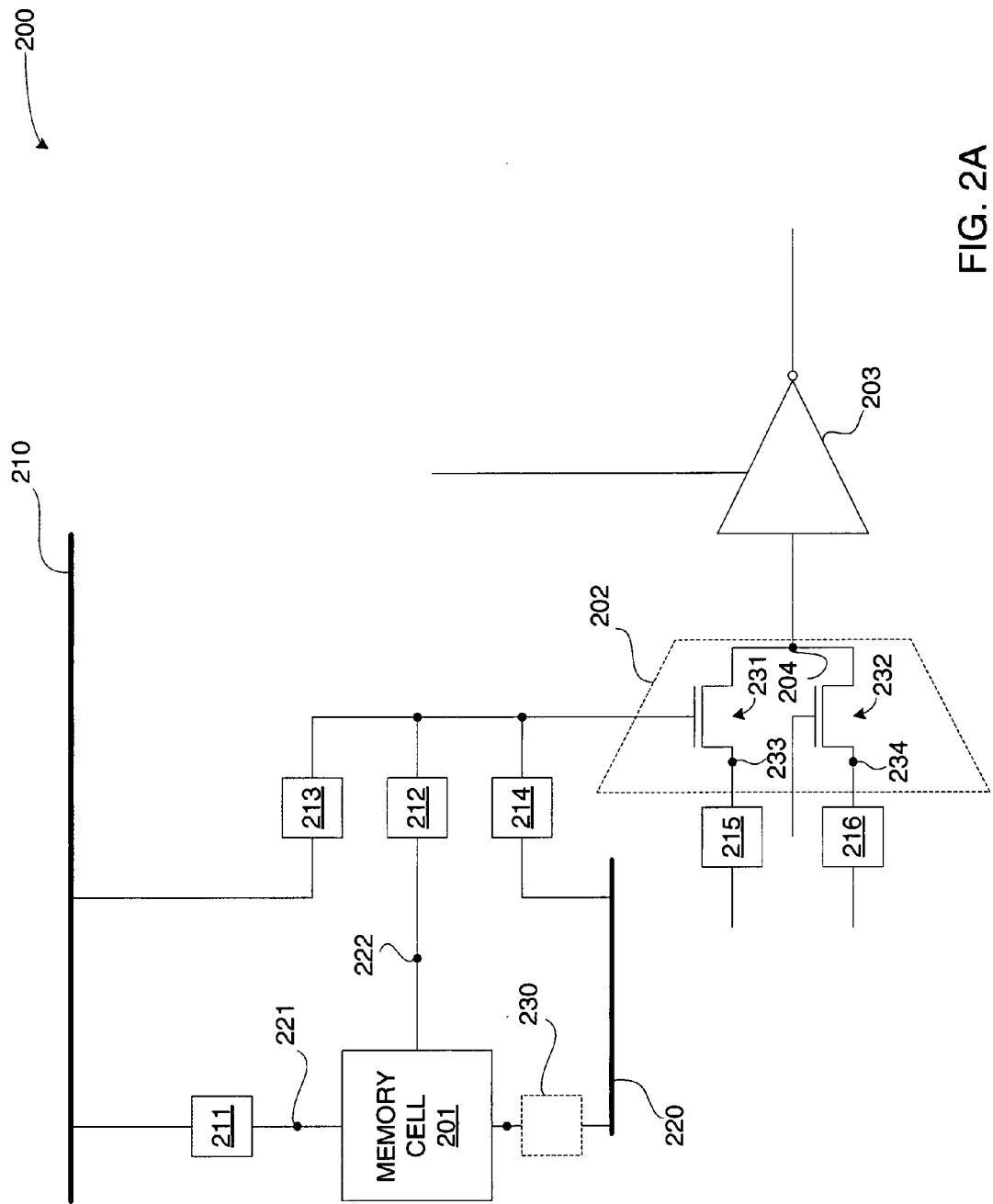
FIG. 2A is a schematic diagram depicting an exemplary embodiment of a programmable logic resource.

FIG. 2A is a schematic diagram depicting an exemplary embodiment of a programmable logic resource 200. Programmable logic resource 200 includes configuration memory cell 201. Memory cell 201 may be coupled to supply voltage bus 210 by contact via ("via") 211. Conventionally, a via is formed by creating a hole in a dielectric layer separating two conductive layers. The hole is filled with a conductor to connect the two conductive layers. As vias are well known in the manufacture of semiconductor devices, they are not described in unnecessary detail for purposes of clarity.

A supply voltage node 221 of memory cell 201 may be physically connected to supply voltage bus 210 by forming via 211. In the alternative, via 211 may not be formed, and thus memory cell 201 is not coupled by via 211 to supply voltage bus 210. Furthermore, an output node 222 of memory cell 201 may be coupled to a gate of transistor 231 of pass transistor multiplexer 202 by forming via 212. In the alternative, via 212 is not formed, and thus output node 222 of memory cell 201 is not coupled to the gate of transistor 231 by via 212. It should be understood that in forming a conventional FPGA, vias 211 and 212 are formed. Though only two input paths are illustratively shown for multiplexer 202, it should be appreciated that more than two input paths may be implemented.

It should be appreciated that by not forming vias 211 and 212, memory cell 201 is decoupled from supply voltage bus 210 and from pass transistor multiplexer 202 to reduce leakage current. By not being coupled to supply voltage bus 210 or pass transistor multiplexer 202, memory cell 201 power consumption is reduced for operation of an FPGA having memory cell 201. If multiplexer 202 is used and if via 212 is not formed, then a gate of pass transistor 231 may be coupled either to supply voltage bus 210 or ground bus 220 by forming either via 213 or via 214, respectively.

For low- and medium-volume fabrication of FPGAs, via programming may be done using a direct write to a semiconductor wafer used to form the die for such FPGAs. Direct writing may be done with an e-beam, as is known. For higher volumes of manufactured FPGAs, where tooling costs may be justified by spreading such cost out over a significant number of FPGAs, one or more lithographic masks may be used for via programming. In the description that follows, multiple vias are described along with via programming for each of those vias. Again, this via programming may be done by direct write or by mask technology, or by a combination thereof.

Memory cell 201 is illustratively shown as being via programmably coupled to supply voltage bus 210 with reference to via 211. This assumes that memory cell 201 is coupled to ground bus 220. Alternatively, memory cell 201 may via programmably coupled to ground bus 220 as illustratively shown with dashed box 230.

Formation of via 212 is mutually exclusive with respect to either the formation of via 213 or the formation of via 214. Furthermore, the formation of via 213 and via 214 is mutually exclusive.

When formed, via 213 couples a gate of NMOS transistor 231 to supply voltage bus 210 or, in other words, to a logic high level. Thus, it should be appreciated that by directly wiring a gate of a pass transistor, such as transistor 231 of pass transistor multiplexer 202, by via programming, leakage current may be avoided rather than controlling such device using a configuration memory cell 201 which inherently has some charge leakage.

Alternatively, via 213 may not be formed and via 214 may be formed instead. Via 214 couples the gate of transistor 231 to a ground bus 220. In this configuration, the gate of NMOS transistor 231 is coupled to a logic low level by via 214. Again, a direct coupling of the gate of transistor 231 to ground bus 220 by via programming involves less leakage current than use of a configuration memory cell 201 output to gate such transistor. However, it should be appreciated that the reconfigurability of programmable logic resource 200 is diminished by use of either of vias 213 or 214 in contrast to use of vias 211 and 212 for use of memory cell 201.

Multiplexer 202 includes two input nodes, namely input node 233 and input node 234. Input node 233 is associated with a source node of transistor 231, and input node 234 is associated with a source node of transistor 232. Drain nodes of transistors 231 and 232 are shorted to one another at an output node 204 of multiplexer 202 coupled to provide an input to inverter buffer 203. Though not illustratively shown, a voltage may be applied to the gate of pass transistor 232 using a separate set of circuitry, which is equivalent to that described with reference to providing a gating voltage to pass transistor 231. Alternatively, the voltage may be provided by one or more inverters, or other logic.

Accordingly, in one configuration, either a logic 1 or a logic 0 is supplied to the pass gate of transistor 231 by via 213 or 214, respectively. In another configuration, vias 213 and 214 are not formed, but rather vias 211 and 212 are formed for use of configuration memory cell 201.

Each pass transistor 231 and 232 is connected in series with an optional via, namely vias 215 and 216, respectively. In one configuration, one, if any, of vias 215 and 216 may be formed corresponding to pass transistor 231 or 232, respectively, being in an ON or substantially conductive state, and the other via left unmade. So, for example, if transistor 232 was in a generally conductive state and transistor 231 was in a generally non-conductive state, via 216 may be formed using via programming, and via 215 may be left unmade. Alternatively, if transistor 231 was in a generally conductive state, and transistor 232 was in a generally nonconductive state, then via 215 may be formed, and via 216 is not formed responsive to via programming. By forming only one input, namely either forming via 215 to couple input node 233 to a signal input, or forming via 216 to couple input node 234 to a signal input, leakage may be avoided or reduced. For example, suppose that via 215 is formed and via 216 is not formed, then a leakage path source-to-drain through pass transistor 232 of multiplexer 202 is avoided or reduced.

There are multiple target configurations for which vias may or may not be formed with via programming. In one configuration, an FPGA is via programmed responsive to a user design where no field programmability of configuration memory cells 201 of FPGA 100 remains. In this "fixed function" configuration, all configuration memory cells 201 associated with instantiation of a user design in a test FPGA platform are via programmed to provide a generally static or hardwired design. Those configuration memory cells that are not used are via programmed such that they not coupled to supply voltage bus 210 and/or ground bus 220.

A variation to this "fixed function" configuration is to form a portion of vias 211 and/or 212 associated with memory cells 201 associated with instantiation of a user design in a test FPGA platform. In this "partial fixed function" configuration, a portion of memory cells 201 are replaced with hard-wired logic by forming associated vias 213 and/or 214, as described above. In the "partial fixed function" configuration, another portion of configuration memory cells 201, associated with instantiation of a user design in such a test FPGA platform, is to be field programmable, and thus vias 211 and 212 for such other portion of configuration memory cells 201 are formed. In sum, for the "partial fixed function" configuration, a memory cell 201 not used in a user's design that is to be static through multiplexer 202 may not have one or more of vias 211 and 212 formed responsive to via programming and may have either via 213 or 214 formed, where the other of vias 213 and 214 is not formed, and an associated input path via formed, such as via 215 or 216. Accordingly, depending on whether memory cell 201 in the user's design was set to store only either a logic 1 or a logic 0, respectively, via 213 or via 214, respectively, may be formed.

Furthermore, for those multiplexers 202 entirely not used in the partial fixed function configuration, or for that matter in the fixed function configuration, none of vias 211 through 216 need be formed. Along those lines, in some instances a user design may include use of only one input path of a multiplexer 202, and accordingly the other input path, or other input paths if more than two are present, may be disabled by not forming an associated via, or vias. In the example, either via 215 or via 216 would not be formed, and furthermore vias 211 through 214 associated with a pass transistor of such unused input path of multiplexer 202 may not be formed.

With both examples of the fixed function configuration and a partial fixed function configuration, it has been assumed that all memory cells 201 not part of a user's design do not have one or more of associated vias formed, as previously described, to reduce power consumption. However, a user may desire to leave some unused memory cells 201 available to accommodate a revision or addition to a user design. In those instances, unused memory cells 201, even if they are not part of the present user design, may be via programmed for field programmability. Accordingly, a portion of memory cells 201 which are unused in a user's design instantiated in a test FPGA platform may have associated vias, such as for example vias 211, 212, and 215, formed by via programming, even though such portion of memory cells 201 may not be used in the current field programmable part of a user instantiated design.

It should be appreciated that by replacing memory cell output with hard-wired connections, greater power savings may be obtained for instantiation of a user's design in contrast to actually using memory cells 201. Furthermore, it should be appreciated that greater power savings may be obtained by not forming vias 211 and/or 212 by via programming for memory cells 201 that are not part of a user's design. It should be appreciated that in any of the above-described configurations, a standard product FPGA may be used, subject to via programming. Thus, using via programming, a single FPGA design may be used to produce any of a fully field programmable, partially fixed function/partially field programmable, or a fully fixed function PLD. Accordingly, an FPGA may be tailored to a user's design and application with the same starting platform as used for all such FPGAs to achieve greater economy of scale.

Figure 2B:
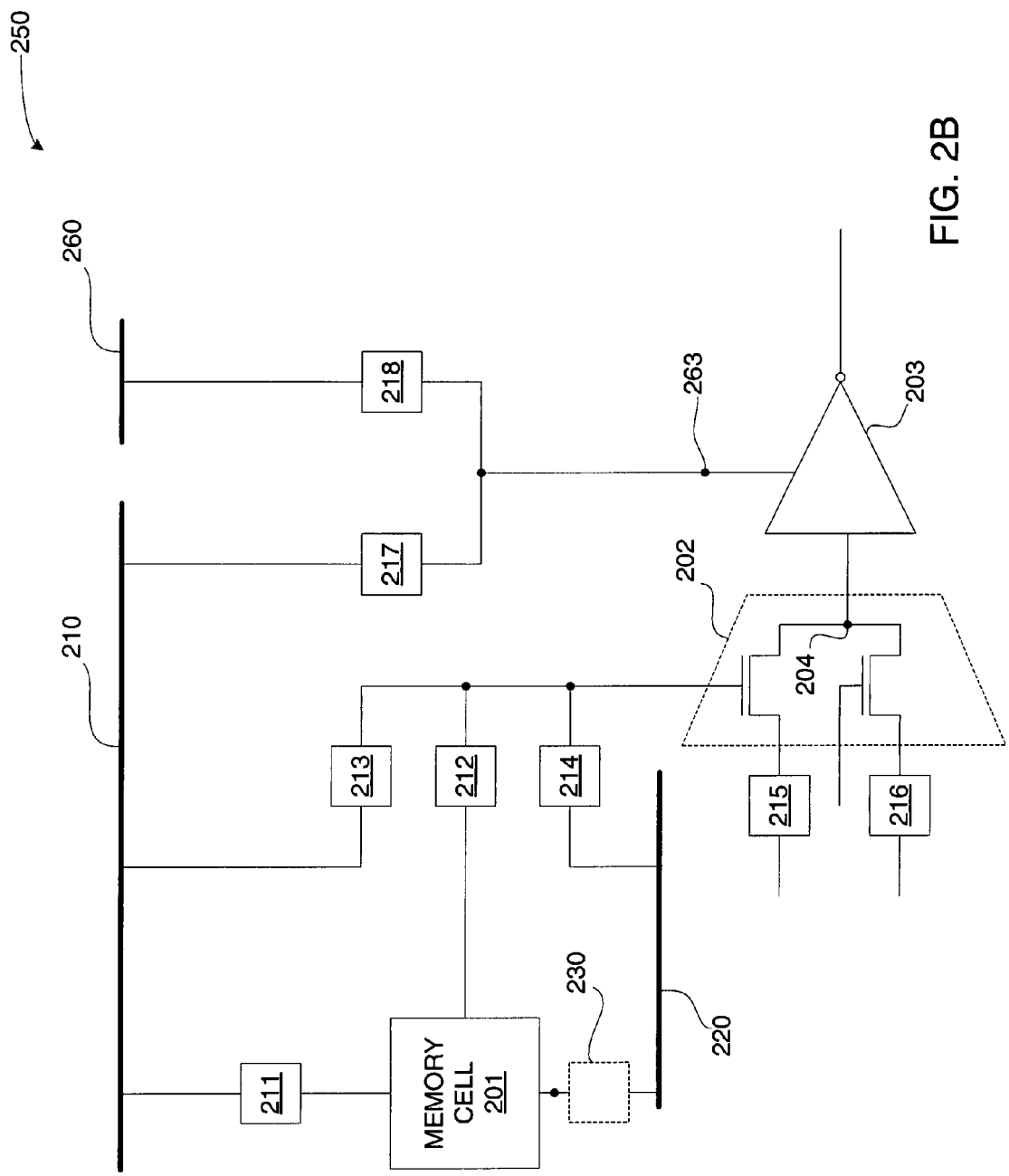
FIG. 2B is a block/schematic diagram depicting an alternative exemplary embodiment of a programmable logic resource.

FIG. 2B is a block/schematic diagram depicting an exemplary embodiment of an alternative programmable logic resource 250. Programmable logic resource 250 is substantially the same as programmable logic resource 200 of FIG. 2A, except that supply voltage bus 260, supply voltage input node 263, and vias 217 and 218 have been added, as illustratively shown. Accordingly, for purposes of clarity, same description is not repeated.

In the event that programmable logic resource 250 is not used as part of an instantiated design, vias 217 and 218 are left unmade. As vias 217 and 218 are respectively coupled to supply voltage buses 210 and 260 on one end and to a supply voltage input node 263 of buffer inverter 203 on another end, buffer 203 is decoupled from a voltage power supply. By not making vias 217 and 218, leakage current of an unused buffer 203 is avoided. Furthermore, powering down buffer 203 by not forming vias 217 and 218 permits disconnection of drain terminals of pass transistors, such as pass transistors 231 and 232 of pass transistor multiplexer 202. This may be done without creating additional buffer leakage current due to a floating input node of buffer 203, with respect to decoupling inputs to multiplexer 202 by not making vias 215 and 216.

Formation of vias 217 and 218 is mutually exclusive. For programmable logic resource 250 in a "critical" or speed-sensitive path, via 217 may be formed to couple supply voltage input node 263 to supply voltage bus 210, and via 218 may not be formed. In a configurable mode of programmable logic resource 250, via 217 may be formed in addition to formation of vias 211 and 212. Alternatively, if programmable logic resource 250 is used, but not in a critical or speed-limiting path, via 217 may be left unmade and via 218 may be formed. It should be appreciated that voltage level of supply voltage bus 260 may be lower than that of supply voltage bus 210. Though only one memory cell, one multiplexer and one buffer is illustratively shown, it should be appreciated that in an FPGA there are multiple instances of these components, and this disclosure equally applies to use of via programming to one or more of these types of components. By having buffers, such as buffer 203, in non-critical or less speed-sensitive paths, dynamic power consumption may be significantly reduced while still meeting performance targets by using a lesser supply voltage level. Thus, by forming via 218 to couple supply voltage input node 263 to supply voltage bus 260, buffer 203 may be powered to operate at a lower voltage level and thus at a slower speed than if via 217 were used to couple supply voltage input node 263 to supply voltage bus 210.

For FPGAs where a power supply is locally selectable through memory cell-controlled pass transistors, as previously described analogously with reference to control of pass transistor multiplexer 202 of FIG. 2A, hard-wiring as previously described may be used. Thus, rather than using a memory cell, such as a configuration memory cell 201, to couple a circuit to a locally selectable power supply voltage bus, a via may be used. This hard-wired configuration using via programming reduces leakage current, as previously described.

An FPGA may be fabricated such that programmably optional vias are located in a limited number of layers, such as three or fewer masking layers. Moreover, an FPGA may be laid out such that optional vias are located in a single lithographic masking layer. Accordingly, via programming may be achieved by introducing a single mask having changes for via programming, where all other masks used to form an FPGA are left unchanged. Furthermore, by having all programmably optional vias as described herein in a single semiconductor fabrication device masking layer, a single level of patterning by direct write e-beam of a wafer may be used.

As previously described, not all configuration memory cells that are not part of an instantiated user's design need to be decoupled or powered down from a supply voltage in a hard-wired or fixed function configuration. For example, a user may opt to retain field configurability of a portion of programmable logic resources of an FPGA even if those resources are not presently part of an instantiated design.

Figure 3:
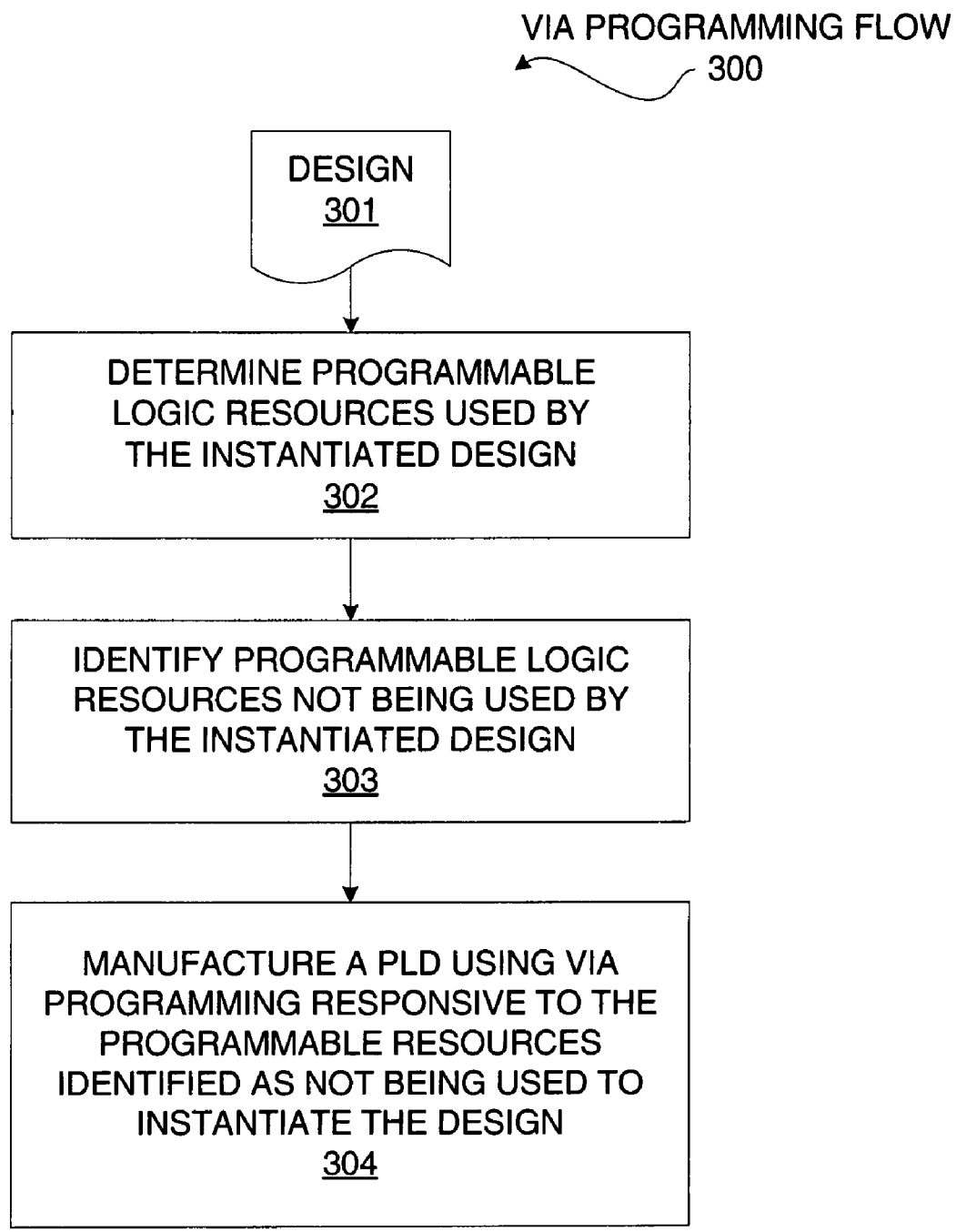
FIG. 3 is a flow diagram depicting an exemplary embodiment of a via programming flow.

FIG. 3 is a flow diagram depicting an exemplary embodiment of a via programming flow 300. A user design 301 is obtained by a manufacturer or other entity doing the via programming. At 302, user design 301 is instantiated in a programmable logic device to determine which programmable logic resources are used. At 302, timing and other performance criteria may be measured to ensure the design is operating as specified by a user. A side benefit of using a standard product FPGA having via programming is that performance, excluding power consumption, may have little to no change caused by via programming, and thus timing verification of the user design may not be invalidated by such via programming. This consistency, for example, facilitates transition from an FPGA used for development to a hard-wired FPGA device configured using via programming for volume production for power-sensitive applications, such as portable devices.

At 303, those programmable logic resources not being used by the instantiated design are identified. As previously mentioned, a portion of the unused resources may be left in a field configurable mode for future use by a user, as described below in additional detail.

At 304, one or more PLDs may be manufactured using via programming as described herein. All or a portion of the programmable logic resources identified as not part of a user's design as identified at 303 are not coupled to draw power responsive to via programming, namely associated vias are not formed. A user may flag some unused programmable logic resources to be field programmable to accommodate subsequent design revision. Those flagged field programmable logic resources may be coupled for example to a supply voltage bus and associated pass transistors responsive to such via programming for future use. All of the programmable logic resources identified at 302 as being part of a user's design may be via programmed such that they are not field configurable, namely such circuits are hardwired responsive to such via programming. A portion of a user's design may allow for having some field programmability along with the hardwiring. Thus it should be appreciated that in a fully or partially fixed function or hard-wired configuration, application-specific via layer or layers may be via programmed to power down circuits, such as configuration memory cells and other circuits, not used in the application and to hardwire at least a significant portion, if not all, of those circuit resources that are used by the application, namely design 301. Along the lines of removing field programmability, vias may be used to replace configuration memory cell outputs by coupling inputs to circuits employed in the user's design with hardwired connections to a supply voltage or ground bus to provide logic 1s or 0s, respectively, to control such used circuits.

Figure 4:
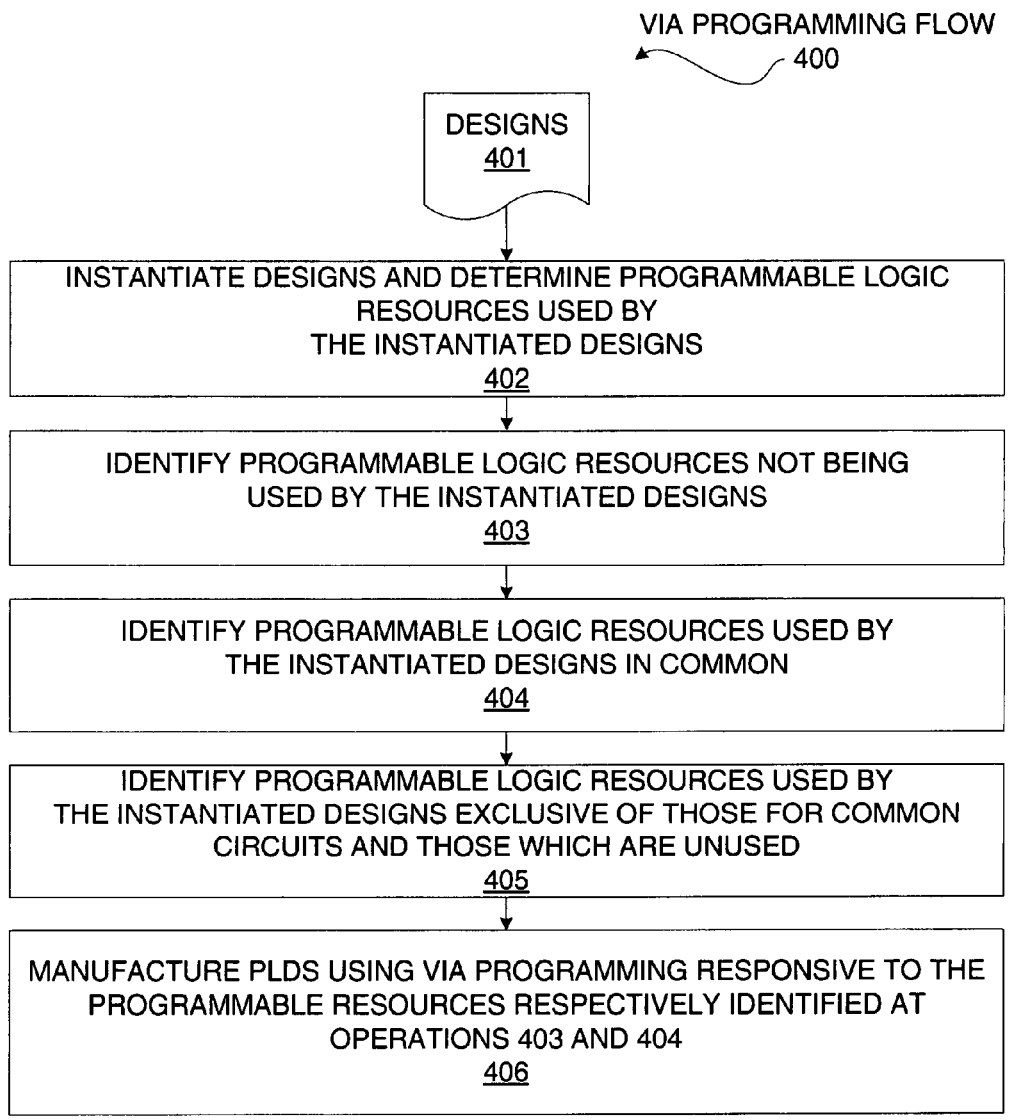
FIG. 4 is a flow diagram depicting an exemplary embodiment of another via programming flow.

FIG. 4 is a flow diagram depicting an exemplary embodiment of a via programming flow 400. User designs 401 are obtained by a manufacturer or other via programming entity. For purposes of clarity by way of example and not limitation, it shall be assumed that there are two user designs 401, one of which includes a receiver and the other of which includes a transmitter. These are merely two known examples of types of circuits, and accordingly it should be understood that the scope of the description is not limited to these particular two types of circuits, as any of a variety of known circuits may be used.

These user designs 401 may be instantiated in the same or separate PLDs, but for purposes of this example it shall be assumed that these user designs are for respective instantiation in separate PLDs. It shall be further assumed for purposes of clarity by way of example and not limitation that both the transmitter and the receiver communicate with one another over a bus coupling the PLDs, where the interface between the receiver to the bus in one of the PLDs and the interface between the transmitter and the bus in the other of the PLDs is the same circuit regardless of whether the receiver or the transmitter is instantiated in programmable logic.

At 402, user designs 401 are instantiated, for example in respective test platform PLDs, to determine which programmable logic resources are used. At 402, timing and other performance criteria may be measured to ensure the designs are operating as specified by a user. A side benefit of using a standard product FPGA having via programming is that performance, excluding power consumption, may have little to no change caused by via programming, and thus timing verification of the user designs may not be invalidated by such via programming. This consistency, for example, facilitates transition from an FPGA used for development to a hard-wired FPGA device configured using via programming for volume production for power-sensitive applications, as well as for multi-use via programmed FPGA platforms.

At 403, those programmable logic resources not being used by the instantiated designs are identified. As previously mentioned, a portion of the unused resources may be left in a field configurable mode for future use by a user. This may be done in each PLD. Still, for purposes of providing a common PLD platform in which either the receiver or the transmitter may be instantiated, common unused programmable logic regions of the PLDs may be identified at 403. Continuing the above example, these common programmable logic regions are not used for any of bus interface, receiver, or transmitter.

At 404, those programmable logic resources being used by both user designs 401 which are common circuits to both user designs 401 are identified. In the above example, these common circuits are for the interface to the bus. However, it should be appreciated that programmable logic may be identified for any common circuits as between user designs. Thus, it is not necessary that distinct blocks of circuit be identified. For example, a circuit within the receiver may be the same as a circuit within the transmitter, and this may be identified at 404.

At 405, any and all differences between programmable logic resources identified at 402 and those identified at 404 may be determined. In other words, at 405, programmable logic resources used by the instantiated designs at 402 are identified exclusive of circuits in common and those programmable logic resources which are not used for both of the instantiated designs. Continuing the above example, either the receiver or the transmitter may be instantiated in programmable logic resources which have been left field programmable. In other words, at power up of a PLD, either a receiver or a transmitter may be configured in programmable logic depending upon into which socket the PLD is loaded. There may be some exceptions to this mutually exclusive nature of receiver and transmitter. For example, selection of a power-supply voltage may be common to both receiver and transmitter. However, for purposes of clarity by way of example and not limitation, it shall be assumed that the receiver and transmitter circuits are mutually exclusive.

At 406, one or more PLDs may be manufactured using via programming as described herein. In this example, all or a portion of the unused memory cells 201 identified at 403 may be disabled using via programming. Furthermore, the common circuits identified at 404 may be hard-wired using via programming. Lastly, the difference between programmable logic resources identified at 402 and those identified at 404 are the programmable logic resources manufactured as field programmable using via programming.

With continuing reference to FIG. 4 and renewed reference to FIG. 2B, programmable logic resources identified at 403 need not have any of vias 211 through 218 formed. Programmable logic resources identified at 404 may be via programmed by forming either via 213 or 214 of vias 211 through 214 as applicable, by forming either via 217 or 218 as applicable, and as between vias 215 and 216, by forming the one associated with a selected input. Programmable logic resources identified at 405 may be formed to be field programmable by forming vias 211, 212, 215, and 216 of vias 211 through 216 and by forming either via 217 or 218 as applicable. If it is not known whether voltage associated with formation of via 218 may be used, formation of via 217 may be used as a default.

Accordingly, it should be appreciated that a significant reduction in leakage power consumption may be achieved using a hard-wired mode responsive to via programming as described herein. Though a single programmable logic resource was illustratively shown in FIGS. 2A and 2B, it should be appreciated from FIG. 1 that there are actually a multiple number of such resources in an FPGA.

Along those lines, it should be appreciated that use of pass-transistor multiplexer 202 of FIGS. 2A and 2B may be via programmed such that a known state is provided to an input of buffer 203 to avoid a floating input to such buffer. As multiple buffers 203 may be coupled to one another, output of such buffers 203 may be set to a known state. Alternatively, buffers 203 not part of a user's design in some instances may not have one or more vias formed to avoid having buffers 203 coupled to a supply voltage and/or ground. For example, in FIG. 2B, both vias 217 and 218 may not be formed to reduce power consumption of buffer 203.

Furthermore, in an embodiment as described herein, dynamic power consumption may be reduced by using a supply voltage level which is lower than another supply voltage level. The lower supply voltage level may be used for programmable logic resources identified as being in non-critical or less speed-sensitive paths.

It should be appreciated that in contrast to conventional via programming where an integrated circuit is reduced in area, via programming an FPGA as described above is not an area reducer. Rather, all the logic resources for the FPGA may still be formed, and the area consumed will remain the same. However, logic resources not coupled to power and/or ground of the via-programmed FPGA may not draw power, and thus a reduced-power consuming FPGA may be provided. It should be appreciated that by not substantially altering the basic FPGA area, timing analysis done while prototyping a design in an FPGA may be substantially unaltered in a via-programmed FPGA. Thus, a design may be instantiated in a via-programmed FPGA, where the timing of such design is the same as when instantiated in a non-via programmed FPGA. However, the via-programmed FPGA may consume less power with the instantiated design than when such design is instantiated in the non-via programmed FPGA. It should be appreciated that multiplexers are merely one possible example, and that power in structures other than multiplexers may be reduced through via programming in the manner described above.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for reducing standby power for a programmable device, the method comprising:
   identifying configuration memory cells responsive to instantiation of a user design in a test platform of the programmable device;
   via programming the programmable device during manufacturing thereof to:
   not form a first set of contact vias associated with a first portion of the configuration memory cells that are not used by the instantiated user design; and form a second set of contact vias associated with a second portion of the configuration memory cells that are used by the instantiated user design; and forming one of a first contact via or a second contact via for coupling a circuit of the programmable device to either a first supply voltage or a second supply voltage;

wherein the first supply voltage is greater than the second supply voltage, the first contact via is formed for the circuit being in a speed-limiting path, and the second contact via is formed for the circuit not being in a speed-limiting path.

2. The method according to claim 1, wherein the programmable device manufactured is a common platform for a plurality of user designs including the user design, the plurality of user designs having first circuitry which is common to each user design of the plurality of user designs and second circuitry which is not common.

3. The method according to claim 1, wherein the second portion of the configuration memory cells is coupled to a supply bus and a ground bus; and wherein the first portion of the configuration memory cells is not coupled to at least one of the supply bus and the ground bus.

4. The method according to claim 3, wherein the programmable device is capable of being formed in a same or similar manner to the test platform of the programmable device apart from the via programming and is tailored for the subsequent instantiation of the user design responsive to the via programming to reduce power consumption without a corresponding reduction in semiconductor die size.

5. The method according to claim 1, wherein the programmable device is capable of being formed in a same or similar manner to the test platform of the programmable device apart from the via programming and is tailored for the subsequent instantiation of the user design responsive to the via programming, and wherein timing associated with the user design instantiated in test platform of the programmable device is substantially unaltered in the programmable device with the via programming.

6. The method according to claim 1, further comprising:
identifying unused input paths of multiplexers associated with the first portion of the configuration memory cells of the programmable device; and
the via programming including not forming third contact vias for circuitry associated with the unused input paths.

7. The method according to claim 1, further comprising;
determining whether a circuit of the programmable device is associated with a speed-limiting path.

8. A method for reducing standby power for a programmable device, the method comprising:
instantiating a user design in a test platform of the programmable device;
identifying unused input paths of multiplexers associated with a first portion of configuration memory cells of the programmable device;
identifying a second portion of configuration memory cells that are not used by the instantiated user design responsive to instantiation of the user design in the test platform;
via programming to disable circuitry associated with the unused input paths;
via programming the programmable device during manufacturing thereof to:
not form a first set of contact vias associated with the second portion of the configuration memory cells that are not used by the instantiated user design; and
form a second set of contact vias associated with a third portion of the configuration memory cells that are used by the instantiated user design; and
forming one of a first contact via or a second contact via for coupling a circuit of the programmable device to either a first supply voltage or a second supply voltage;
wherein the first supply voltage is greater than the second supply voltage, the first contact via is formed for the circuit being in a speed-limiting path, and the second contact via is formed for the circuit not being in a speed-limiting path.

9. The method according to claim 8, wherein the circuitry is disabled at least in part by not coupling gates of pass transistors of the multiplexers associated with the unused input paths to receive voltage from any of a supply bus, a ground bus, or the first portion of configuration memory cells.

10. The method according to claim 9, wherein the circuitry is disabled at least in part by not coupling sources of pass transistors of the multiplexers associated with the unused input paths to receive voltage input.

11. The method according to claim 8, wherein the circuitry is disabled at least in part by not coupling sources of pass transistors of the multiplexers associated with the unused input paths to receive voltage input.

12. The method according to claim 8, further comprising:
identifying used input paths of the multiplexers associated with a third portion of the configuration memory cells of the programmable device;
via programming the programmable device during manufacturing thereof to:
not couple a first portion of the third portion of the configuration memory cells for field programmability and to form a first portion of the user design associated with the first portion of the third portion of the configuration memory cells as hard-wired; and
couple a second portion of the third portion of the configuration memory cells for field programmability for subsequent instantiation of a second portion of the user design in the programmable device.

13. The method according to claim 12, further comprising manufacturing the programmable device as a common platform for a plurality of user designs including the user design, the plurality of user designs having first circuitry which is common to each user design of the plurality of user designs and second circuitry which is not common.

14. A method for reducing standby power consumption by a programmable device having a plurality of configuration memory cells, comprising:
manufacturing the programmable device including the plurality of configuration memory cells, wherein the manufacturing includes:
for each configuration memory cell of the plurality of configuration memory cells that is part of a user design, forming a via connecting the configuration memory cell to a supply voltage; and
for each configuration memory cell of the plurality of configuration memory cells that is not part of the user design, not forming a via connecting the configuration memory cell to a supply voltage.

* * * * *